June 24, 1952  H. E. ROSE  2,601,327
PHOTOMETRIC APPARATUS
Filed Jan. 10, 1950  2 SHEETS—SHEET 1

INVENTOR
Harry E. Rose
BY Eric E. Jeanbe
ATTORNEY

Patented June 24, 1952

2,601,327

UNITED STATES PATENT OFFICE 2,601,327

PHOTOMETRIC APPARATUS

Harry E. Rose, Buchanan, N. Y., assignor to Interchemical Corporation, New York, N. Y., a corporation of Ohio Application January 10, 1950, Serial No. 137,856

2 Claims. (Cl. 250—214)

This invention pertains to a new method of comparing or measuring radiant energy, being especially useful in the art of spectrophotometry and colorimetry.

It has long been known that the most precise method of measuring the amount of light reflected by a surface is to compare the light reflected by the surface with the light reflected by a standard surface of known reflectance. This comparison can best be made by allowing the reflected beams to fall alternately on a photosensitive device, as described, for example, in U. S. Patent No. 1,806,198. The substitution of the one beam for the other is effected in that case by rotating a glass disk containing sectors that are alternately clear or silvered. The clear sectors allow one of the beams involved in the comparison to reach the photo-sensitive device; the silvered sectors cut off this beam while the other beam is reflected onto the photo-sensitive device. If, then, the light falling on the standard surface is reduced until, despite the alteration of the beams, no variation occurs in the response of the photo-sensitive device, the amount of reduction is a measure of the reflectance of the surface under test. The reflectance scale can be calibrated by using another standard surface as the test surface.

An objectionable feature of the above arrangement is a spurious signal the frequency of which is just twice the fundamental frequency. That is, if the glass disk contains two silvered sectors and two clear sectors, rotation of the disk at the rate of 30 revolutions per second should cause the photo-sensitive device to generate an electrical signal at a frequency of 60 cycles per second, assuming that the two beams are of unequal intensity. When the two beams are brought closer and closer to the point of balance, the amplitude of this 60 cycle signal should approach zero as the limit. Actually, however, the substitution of one beam for the other occurs in this case at the rate of 120 substitutions per second; and the transition, even when the two beams are of equal intensity, is found to give rise to a strong second harmonic that can easily mask the weaker fundamental.

A very large proportion of the recording spectrophotometers in use at the present time effect the alternation of the two beams in a manner set forth in U. S. Patent No. 1,987,441. In this case, the rotating sector wheel is replaced by a rotating Nicol prism. The two beams having been previously polarized in mutually perpendicular planes, rotation of the Nicol prism produces a smooth sinusoidal signal when the two beams are of unequal intensity. This device is eminently satisfactory, except for the fact that polarizing prisms are expensive, as is the auxiliary equipment.

The present invention will be best understood with reference to the drawing, which, in Fig. 1, shows a biprism dividing a beam of light into two beams, one of which illuminates a sample surface and the other a standard surface. Adjacent to this prism is a reed that can be set into vibration by electrical impulses. The motion of the reed being sinusoidal, a vane at the end of the reed causes the two beams of light to be modulated sinusoidally also.

The optical system of a spectrophotometer embodying this vibrating reed preferably has the general appearance of the system disclosed in Figure 4 of U. S. Patent No. 1,987,441, except that the Wollaston prism which splits the single beam into two, is replaced by the aforementioned biprism and that the herein claimed reed takes the place of the rotating prism of the said patent. The reduction in intensity required to bring about a balance can be accomplished in any known manner, as, for example, by the use of polarizing elements, adjustable apertures, etc.

The vibrating reed is operated, at a constant frequency and substantially constant amplitude, from a suitable source of alternating current. To understand the operations, assume the reed to be in vibration and the two beams to be unbalanced. The vibration of the reed will cause a signal to be generated by the phototube. This signal can be amplified to operate, say, a zero-centered signal detector, such as a micro-ammeter. Depending upon which of the two beams causes the greater response in the phototube, the needle of the signal detector will be deflected either to the left or to the right of the zero position. If the amount of light in the more intense of the two beams is then gradually reduced, the needle should move toward the center of the scale and be exactly in zero position as soon as the two beams are in balance. However, due to spurious signals from the amplifier, the balance point of the signal detector is masked, which makes the determination of the balance point difficult and unreliable. To overcome these difficulties, the present invention comprises a frequency selecting filter in conjunction with the amplifying means, which is characterized by permitting passage of only the signals originating from the vibrating reed and rejecting all other signals. In addition, a feedback circuit from the filter to the amplifier provides the necessary linear gain in the desired frequency.

According to prior methods of selective amplification, which are characterized by stable, but relatively low gains (of the order of about 100) and by having output frequency bands of a width allowing variations of ±5 to 10 cycles from the center frequency, spurious signals are amplified, to a certain extent, together with the desired signals. The herein disclosed circuit results in a high stable gain of about 1000 times, whereby the band width of the amplifier output is narrowed to such a degree that for all practical purposes only signals of the desired frequency are allowed to pass to the signal detector.

This is accomplished by employing, after an initial amplification of the signals generated by the photoelectric device, a two-stage, cathode coupled amplifier together with an asymmetric parallel-T filter. In driving the parallel-T filter from the low impedance output plate of the amplifier and feeding the output of the parallel-T filter back to an amplifier input point of high terminal impedance apart from the signal input point of the amplifier, a complete separation is obtained between the signal input and the feedback, without any loss in signal or feed-back voltage. After tuning the filter to, say, 60 cycles, all frequencies except 60 cycles are fed back as grid voltage in order to degenerate them, while the 60 cycle signals not being degenerated by the filter feed-back, are passed on to the measuring device.

The advantages of the described circuit, not realized before, are found in the arrangement of the feed-back circuit elements connecting the parallel-T filter to the cathode coupled amplifier tubes. For optimum performance, the filter must be supplied with a driving impedance relatively low compared to its own input impedance. This is realized with the particular output tube and circuit. Also, the filter load resistance must be relatively high compared to its output impedance. In order to have a very narrow band pass operation, the gains of the cathode coupled amplifier tubes need to be very large. In known circuits of this type, high gain from full feed-back results in instability. It is a feature of this circuit that, because of the practically complete isolation between the signal input and the several stages of amplification, the required stability of the amplifier output is attained. In addition the direct coupling of the two-stage amplifier tubes eliminates phase shifts which would cause instability.

Figure 1:
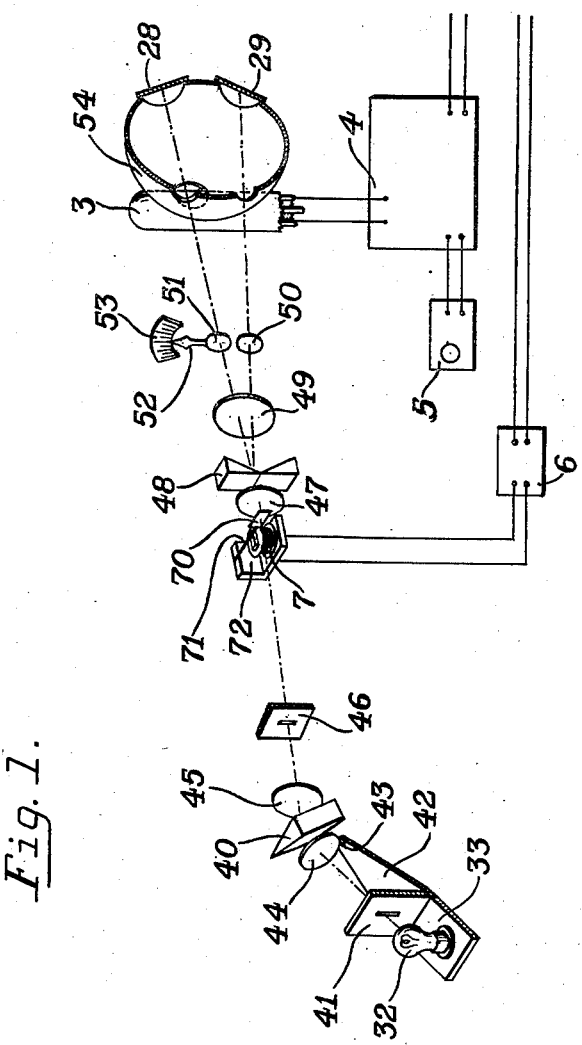
Fig. 1 is a schematic view of one embodiment of the assembled instrument.

Referring in detail to the drawings, Fig. 1 illustrates a light source 32 and a slit plate 41 mounted on a base plate 33, the arm 42 of which has a pivotal center 43 so as to permit changes of the position of the light source and the slit relative to a prism 40 in order to enable the selective employment of any desired part of the spectrum. The lenses 44 and 45 are placed on either side of the said prism in order to collimate the light through the prism and to form an image of the entrance slit 41 at the exit slit 46 of the collimator. Inserted in the path of light passing from slit 46 is a vane 70 which is mounted on a vibrating reed 71, consisting of, say, a thin blade of spring steel. The reed is fastened to a relatively large mass 72 and the vane is adjusted in size and position in such a manner that a center portion of the light beam is obstructed when the vane is at rest, while a lower portion of the beam is obstructed when the vane is deflected downward, and vice versa. The reed is oscillated by means of a low voltage alternating current, having, most practically, a frequency of 60 cycles per second, furnished by the transformer 6 to the coil of an electromagnet 7, situated in such proximity to the reed that the latter vibrates at maximum efficiency if alternately attracted and repelled by the iron core of the electromagnet. While oscillating, the vane should not interfere with the upper and lower edges of the beam, in order to avoid a chopping effect on the signal waves.

By means of an objective lens 47 an image of the slit 46 is focused onto the rear wall of an integrating sphere 54. The biprism 48 splits the beam into two beams which are then plane polarized by means of the polarizer 49, consisting according to the present embodiment, of a Polaroid sheet between glass plates. Individual analysing elements between glass plates are provided for the two sections of the split beam. The analyzer 50 is adjustably positioned with respect to the polarizer 49 so as to produce light of the desired maximum intensity, while the analyzer 51 is rotatably mounted and provided with a pointer 52, arranged to cooperate with the protractor scale 53 in such a way that the maximum amount of light is transmitted by the analyzer 51 with the pointer turned to the 100% position on the protractor scale.

For the testing of a light-reflecting substance, for instance, a standard and a sample are inserted in ports 28 and 29 of the integrating sphere 54, which has a phototube 3 adjacent to another port thereof. Upon vibration of the reed a sinusoidal signal is generated in the phototube if the two light beams are made unequal in intensity by turning the pointer 52 away from the 100% position, or if a sample and a standard which differ in reflectance are placed in the ports of the integrating sphere. This signal is amplified by means of an arrangement 4 which is shown in detail in Fig. 2. The amplified signal is then employed to operate the signal detector 5.

Figure 2:
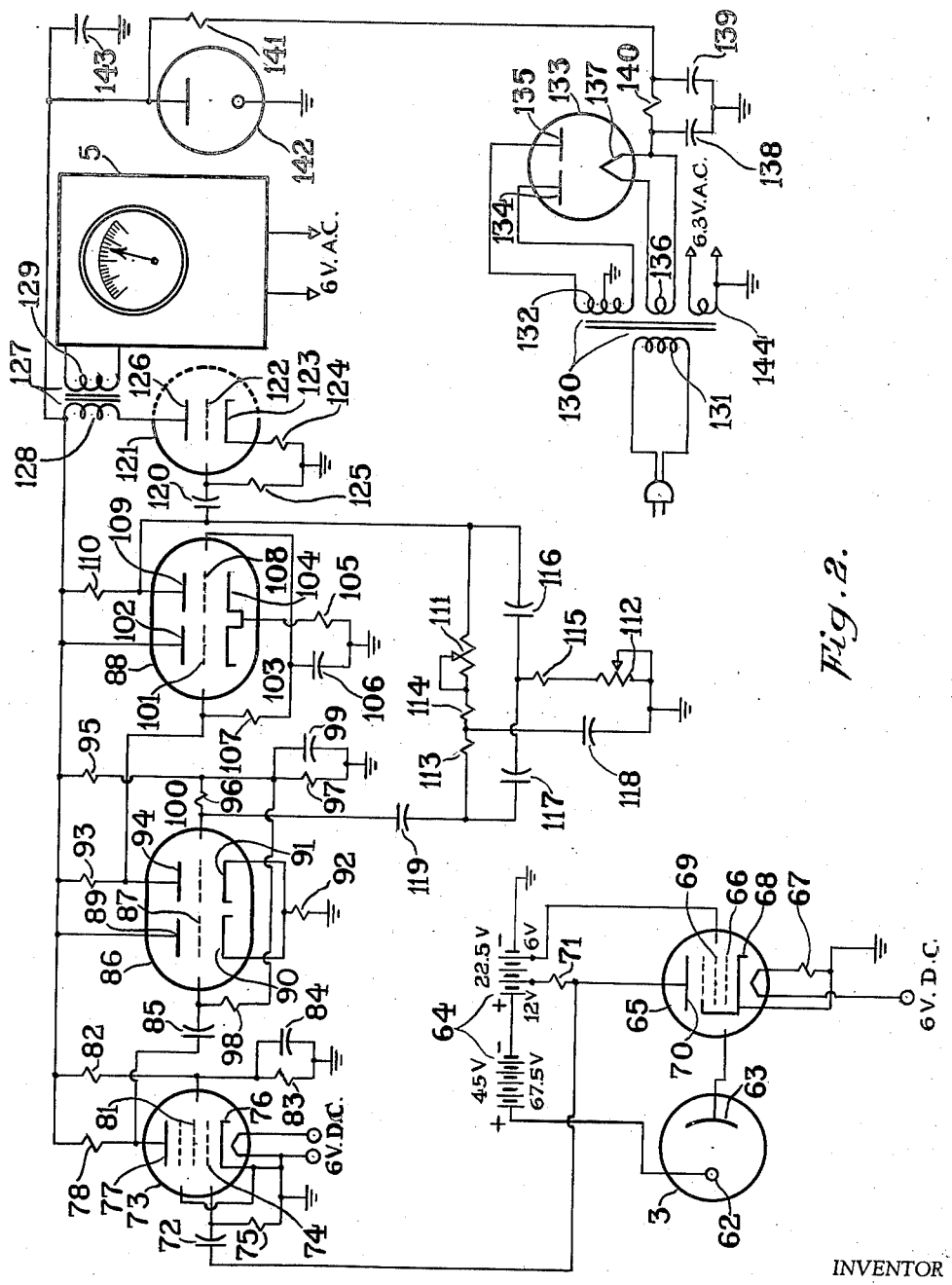
Fig. 2 is an enlarged detail illustrating the amplifier and filter circuit arrangement.

As shown in Fig. 2, the anode 62 of the phototube 3 is energized from a power source, such as the 67.5 volt battery 64, the negative terminal of which is grounded. The cathode 63 of the phototube is connected to the control grid 66 of a vacuum tube 65, such as a (38) pentode with the cathode 68 grounded. The connection of the phototube to the grid of this amplifier tube provides a signal from the load resistor 71 of tube 65 which is a logarithmic function of the light received on the phototube 3. The heater circuit of the vacuum tube is standard except that a resistor for this type tube is inserted, such as the resistor 67 (5 ohms), while the screen grid 69 is connected to a 6 volt terminal of the aforementioned battery. The network extending from the anode 70 of this tube connects through the above-mentioned plate resistor 71 (36 k.) to a 12 volt terminal of the said battery and through the condenser 72 (.1 mf.) to the control grid 74 of the pentode 73 (5693). The network includes, furthermore, a resistor 75 (8 m.) and extends to ground and to the cathode 76 of the said pentode, the heater of which is energized by a supply of 6 volt direct current.

Voltage, supplied to the anode 77 from a plate resistor 78 (500 k.) in the power supply circuit, after passing the condenser 85 (.2 mf.), is applied to the grid 87 of the tube 86 which comprises part of a two-stage amplifier, each stage being cathode coupled. The screen grid 81 of the tube 73 is provided with a positive potential relative to the ground by means of circuit elements including the resistors 82 (510 k.), 83 (510 k.), and the capacitor 84 (.2 mf.).

The aforementioned two-stage, cathode coupled amplifier consists of two twin thermionic tubes 86 and 88, preferably a (6SL7) and a (6J6) tube, used as input and output stages, respectively. The anode 89 of the first named tube is kept at a constant voltage. The cathodes 90 and 91 of this tube are provided with a common cathode resistor 92 (15 k.) while load resistor 93 (500 k.) connects the tube to the regulated power supply. Another circuit, including the resistors 95 (80 k.), 96 (1.5 m.), 97 (12 k.), 98 (1 m.), and the capacitor 99 (40 mf.), conveniently provides the two control electrodes 87 and 100 with the required biases. Signals taken from the anode 94 are applied to the control electrode 101 of tube 88, the anode 102 of which is kept at a constant voltage. A common cathode resistor 105 (20 k.) connects the two cathodes 103 and 104 to ground. By means of a network extending to ground and including the capacitor 106 (.5 mf.) and the resistor 107 (2 m.), the control electrode 108 is supplied the proper bias. Inserted in the voltage supply circuit for the anode 109 is the plate resistor 110 (20 k.). The signals taken off the anode 109 after the two stages of amplification are transmitted to a parallel-T network, consisting of the potentiometers 111 (50 k.) and 112 (25 k.), the resistors 113 (330 k.), 114 (75 k.), and 115 (25 k.), and the capacitors 116 (.025 mf.), 117 (.01 mf.) and 118 (.03 mf.). The signals taken from the filter are passed through the condenser 119 (.1 mf.). By returning them to the control electrode 100 of tube 86, a complete isolation is obtained between the feedback and the signal input at the control electrode 87 of the two-stage amplifier.

The amplifier output taken off the anode 109 of tube 88, after passing through the condenser 120 (.05 mf.), is applied to the control electrode 122 of tube 121, conveniently one-half of a (6SN7) tube, the cathode 123 of which is connected to ground through the resistor 124 (1 k.), and to the control electrode through the resistor 125 (1 m.) to provide the control electrode with the necessary negative potential. The anode 126 of this tube is connected to the primary 128 (30 k.) of a transformer 127, the secondary 129 of which furnishes an impedance of 500 ohms. The output of the said transformer secondary, augmented with a 6.3 volt balancing potential of alternating current, is used to operate a zero centered microammeter 5 as the measuring instrument.

The power supply consists of a transformer 130, the primary 131 of which is conveniently connected to a 110 volt source of alternating current. The transformer comprises three secondaries. The secondary 132 (350-0-350 v.) is connected to the anodes 134 and 135, respectively, of a full wave rectifier tube 133 (5Y3), while the secondary 136 (5 v.) is connected to the filament 137 of the rectifier tube. The output of the rectifier tube is fed to a resistance-capacitance filter consisting of the condensers 138 and 139 (10 mf. each) and the resistor 140 (1 k.). The filter supplies direct current of approximately 350 volts. In order to obtain a regulated voltage supply of, say, 150 volt, the resistor 141 (7 k.) is inserted in a network connecting the filter with a voltage regulator 142 (VR150). A circuit including the condenser 143 (.5 mf.) provides voltage for the anodes and control electrodes of tubes 73, 86, 88 and 121. The third secondary 144 (6.3 v.) of the transformer 130 furnishes alternate voltage to energize the heaters (not shown in the drawing) of tubes 86, 88 and 121.

I claim:

1. In a photometric apparatus comprising means for generating two adjacent light beams, one of the said beams being directed at a standard and the other at a sample, means for attenuating one of the said beams, a phototube arranged to receive combined light from the standard and the sample, means for determining the phase and amplitude of signals generated in the said phototube, a reed and adapted to vibrate at constant frequency and substantially constant amplitude, and a vane, mounted on the reed, obstructing substantially equal alternate portions of the said light beams when the reed is vibrating, the improvement of inserting between the phototube and the means for determining the phase and amplitude of signals generated in the said phototube a circuit for amplifying signals having the frequency of the vibrating reed, comprising a two-stage, cathode coupled amplifier and a feed-back network consisting of an asymmetric parallel-T filter connecting the low impedance amplifier output source to a high terminal impedance amplifier input point independent of the signal input point.

2. In a photometric apparatus comprising means for generating two adjacent light beams, one of the said beams being directed at a standard and the other at a sample, means for attenuating one of the said beams, a phototube arranged to receive combined light from the standard and the sample, means for determining the phase and amplitude of signals generated in the said phototube, a reed adapted to vibrate at constant frequency and substantially constant amplitude, and a vane, mounted on the reed, obstructing substantially equal alternate portions of the said light beams when the reed is vibrating the improvement of inserting between the phototube and the means for determining the phase and amplitude of signals generated in the said phototube a circuit comprising a two-stage, cathode coupled amplifier and a feed-back network consisting of an asymmetric parallel-T filter tuned to the frequency of the vibrating reed, arranged to substantially separate the signal input and the feed-back without loss in feed-back voltage and signal voltage.

HARRY E. ROSE.

REFERENCES CITED

The following references are of record in the file of this patent:

UNITED STATES PATENTS

| Number | Name | Date |
|---|---|---|
| 2,139,489 | Cockrell | Dec. 6, 1938 |
| 2,494,607 | Bouche | Jan. 17, 1950 |